Oct. 23, 1951 W. E. O'SHEI 2,572,751
VEHICLE DIRECTION INDICATOR
Filed April 24, 1948

Inventor
WILLIAM E. O'SHEI
By
Emery, Holcomb & Blair
Attorney

Patented Oct. 23, 1951

2,572,751

UNITED STATES PATENT OFFICE 2,572,751

VEHICLE DIRECTION INDICATOR

William Edward O'Shei, London, England

Application April 24, 1948, Serial No. 22,993
In Great Britain April 26, 1947

6 Claims. (Cl. 177—329)

The present invention relates to vehicle direction indicators of the semaphore type which are actuated by an electric solenoid. Generally the solenoid comprises a core tube which is secured at its ends, for example, by spinning, to end brackets by means of which the core tube with the solenoid wound thereon is secured to the magnetic framework of the indicator. This construction gives rise to manufacturing difficulties, and due to the tolerances essential for mass production methods, the core tube when mounted on the indicator framework, is not always accurately located with respect to the pivot pin of the indicator arm and any stops which may be provided for holding the moving parts of the mechanism when in the non-display position for preventing rattle.

The present invention has for its object to provide an improved method of construction and to this end consists in die-casting the solenoid core tube integrally with the bearing for the indicator arm, so that the relative positions of the core axis and the bearing can be maintained substantially constant. To this end the bearings for the indicator arm are preferably cored in the die-casting.

In addition or alternatively to die-casting the bearing for the indicator arm integrally with the solenoid, according to another feature of the invention either one or both of the stops as described in the specification of my Patent No. 2,516,480 dated July 25, 1950, may be die-cast integrally with the solenoid core tube and thus eliminate or reduce the adjustment which may be necessary for accurately locating these stops with respect to the armature extending from the solenoid core tube.

According to a further feature of the invention, one or both of the coil cheeks at the ends of the core tube are also die-cast integrally with the tube. The coil cheeks may also be formed as the brackets for securing the solenoid to the indicator framework. In order to make the magnetic circuit as complete as possible, magnetic members may be incorporated as inserts in the end brackets of the die-casting or secured thereto, which magnetic members are adapted to contact with the magnetic framework of the indicator for completing the magnetic circuit between the ends of the solenoid.

Alternatively, magnetic members may be secured to the magnetic framework of the indicator to serve as brackets which extend over the ends of the solenoid casting and serve to support the same. With this construction the die-cast solenoid core tube may be clipped between the two magnetic bracket members projecting from the indicating framework so as to be readily detachable therefrom for replacement. No delicate readjustment would be necessary in this case since the bearing bracket for the arm and the stops are integral with the core tube.

According to a further modified construction, the core tube is die-cast integrally with the arm bearing and the upper cheek or bracket, that is without the lower cheek or bracket. Magnetic end pieces and any insulating washers may then be threaded on to the core tube before the other end piece is secured thereto. The magnetic end members may then comprise apertured discs which are retained between the die-cast coil brackets and the coil wound on the core tube.

By constructing the solenoid core tube as a die-casting it further becomes possible easily to construct the tube with any desired internal cross-section. Thus it may be die-cast with an irregular shape or with a keyway for guiding the movement of the armature therein.

Furthermore the outer surface of the core tube may be die-cast with a helical groove to facilitate winding the first layer of the solenoid coil thereon.

According to a still further feature, the lower end of the solenoid core tube may be cast or subsequently provided with a thread into which a member, preferably a magnetic member, may be screwed and thus provide an adjustable stop for the armature in its bottom position. By adjusting this stop the indicating position of the arm may be adjusted to be horizontal or in any other desired position when the indicator is fitted to a vehicle. The adjustable stop member may be apertured to permit the passage therethrough of a member for actuating a switch in accordance with the movement of the armature.

In order that the invention may be more clearly understood, reference will now be made to the accompanying drawing in which—

Figure 1:
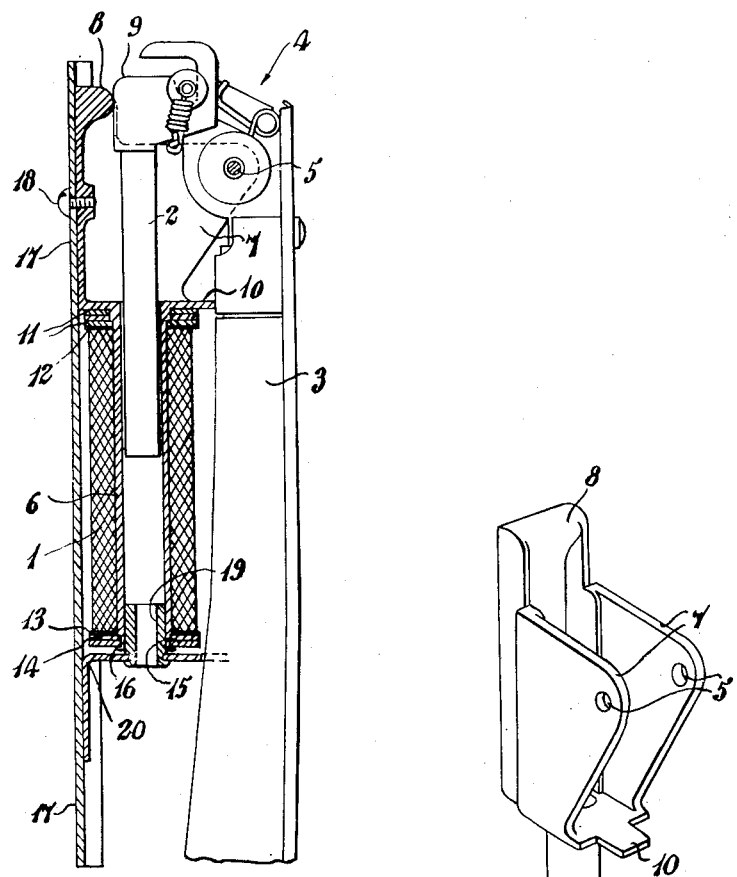
Fig. 1 shows a section through vehicle direction indicator according to this invention.
Figure 2:
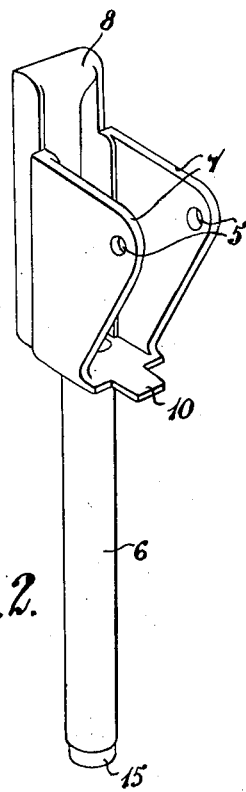
Fig. 2 shows a perspective view of the die-cast core tube and bearing bracket.

Referring to the drawing, the vehicle direction indicator shown is generally of the type described in the specification of co-pending application Serial No. 789,097 filed December 1, 1947, and comprises a solenoid 1 associated with an armature 2 the movement of which actuates the indicator arm 3 through mechanism generally indicated at 4, the operation of which is more fully described in the specification of said patent. The arm 3 is pivoted for swinging movement about the bearing pin 5 carried in the bearing bracket 7.

According to the present invention, the core tube 6 of the solenoid is made of a die-casting integral with the bearing bracket 7 which carries the bearing pin 5 for the indicator arm. Also formed as part of the die-casting is the back stop 8 which engages with the rear of the locking plate 9 provided at the top of the armature, and the front stop 10 with which the indicator arm 3 engages as described in the aforesaid patent for holding the mechanism against vibration when the indicator arm is locked in its non-displayed position.

Before the solenoid coil 1 is wound on the core tube 6, one or more apertured discs 11 of magnetic material are threaded over the core tube together with two apertured discs 12 and 13 of insulating material which are adapted to lie at opposite ends of the wound coil and serve to insulate the coil from the metallic end members. After these discs have been applied, a further apertured disc 14 of magnetic material and having a central aperture of smaller diameter than the other discs is fitted over the reduced diameter portion 15 at the bottom end of the core tube, whereafter the end of the portion 15 is spun over as shown at 16 to retain the disc 14 in position. The solenoid coil 1 is then wound on the core tube.

The unit comprising the die cast bracket 7 and core tube 6 with the solenoid wound thereon is then secured to the frame member 17 of the indicator by a screw 18 passing through the back of the frame member and screwing into the die-casting. The lower end of the core tube is secured by fitting over the magnetic armature stop 19 which is secured, for example by rivetting or spinning, to an aperture in the bottom bracket 20 which is also secured to the frame member 17.

The die-casting is preferably made of a zinc alloy which provides a good bearing material in conjunction with a steel armature.

With the construction described, it will be understood that the apertures in the bearing bracket 7 for the bearing pin 5 (which apertures may be cored in the die-casting) are always correctly located relative to the core tube 6 and the stops 8 and 10, thereby enabling the indicator to be made by mass production methods without adjustment of the parts to compensate for any variation in the space relationship between the bearing, the core tube and the stops, as is the case when these parts are made from metal stampings and separately connected to the indicator frame. Furthermore, the assembly of the components is facilitated.

Whilst a particular embodiment has been described, it will be understood that various modifications may be made without departing from the scope of the invention.

I claim:

1. A vehicle direction indicator comprising a semaphore arm, a pivot about which said arm is adapted to swing, a bearing bracket for said pivot, a solenoid core tube constructed as an integral die-casting with the said bearing bracket, a solenoid coil wound on said core tube, an armature movable in said core tube, mechanism coupling said armature to said semaphore arm to actuate said arm by the movements of said armature, and a front stop formed integral with said casting and adapted to engage with the arm when the latter is in its non-displayed position.

2. A vehicle direction indicator comprising a semaphore arm, a pivot about which said arm is adapted to swing, a bearing bracket for said pivot, a solenoid core tube constructed as an integral die-casting with the said bearing bracket, a solenoid coil wound on said core tube, an armature movable in said core tube, mechanism coupling said armature to said semaphore arm to actuate said arm by the movements of said armature, said mechanism incorporating a locking member for locking the arm in the non-displayed position, a back stop formed integral with said casting and adapted to engage with the locking member when the arm is in its non-displayed position, and a front stop formed integral with said casting and adapted to engage with the arm when the latter is in its non-displayed position.

3. A vehicle direction indicator comprising a semaphore arm, a pivot about which said arm is adapted to swing, a bearing bracket for said pivot, a solenoid core tube constructed as an integral die casting of non-magnetic material with the said bearing bracket, a magnetic member disposed at one end of said core tube, a second magnetic member disposed at the other end of said core tube, a solenoid coil wound on said core tube between said magnetic members, an armature movable in said core tube, and mechanism coupling said armature to said semaphore arm to actuate said arm by the movements of said armature.

4. A vehicle direction indicator comprising a semaphore arm, a pivot about which said arm is adapted to swing, a bearing bracket for said pivot, a solenoid core tube constructed as an integral die-casting with the said bearing bracket, said core tube having a portion of reduced diameter at its end remote from said bearing bracket, an apertured member fitted on to said portion of reduced diameter and secured thereto by forming over the end of the core tube, a solenoid coil wound on said core tube, an armature movable in said core tube, and mechanism coupling the armature to said semaphore arm to actuate said arm by the movements of said armature.

5. Vehicle direction indicator as claimed in claim 4, wherein the die-casting is secured to a frame member, said frame member also carrying a bottom bracket positioned adjacent the end of the core tube remote from the bearing bracket, said bottom bracket carrying a member which fits within the end of the core tube and serves to support the same.

6. Vehicle direction indicator as claimed in claim 5, wherein the member carried by the bottom bracket is made of magnetic material and constitutes the armature stop.

WILLIAM EDWARD O'SHEI.

REFERENCES CITED

The following references are of record in the file of this patent:

UNITED STATES PATENTS

| Number | Name | Date |
| --- | --- | --- |
| 1,744,794 | Pohlmann et al. | Jan. 28, 1930 |
| 2,014,499 | Kraus | Sept. 17, 1935 |
| 2,138,102 | Jablonsky | Nov. 29, 1938 |
| 2,167,239 | Graham et al. | July 25, 1939 |